June 5, 1934.  W. DE BACK  1,961,479

ROTARY BIN

Filed Nov. 7, 1931

INVENTOR.
William de Back.
BY Philip A. Minnis
ATTORNEY.

Patented June 5, 1934

1,961,479

UNITED STATES PATENT OFFICE 1,961,479

ROTARY BIN

William de Back, San Jose, Calif., assignor to Food Machinery Corporation, San Jose, Calif., a corporation of Delaware Application November 7, 1931, Serial No. 573,607

14 Claims. (Cl. 226—129)

This invention relates to rotary dispensing bins of the type adapted to be used in the packing industry to dispense articles such as fruit or vegetables to attendants for packing into boxes or other containers preparatory to shipment.

One of the most frequent uses of packing bins is in connection with fruit grading equipment, with which the bins are associated to receive the graded fruit as it comes from the grading means. When bins of the rotary type are utilized they are generally circular in form and are provided with depressible bottoms so that as the fruit is delivered to them the bottoms are depressed in accordance with the weight of fruit thereon, whereby the level of fruit in each bin is maintained constant. This construction serves the double purpose of maintaining the fruit within convenient reach of the attendants, and also insuring that the pieces of fruit delivered to the bins will fall only a minimum distance from the delivery means onto the mass of fruit in the bin, thus minimizing bruising of the fruit. A driving means is associated with each bin which constantly rotates it, whereby the mass of fruit in the bin is continually passed and repassed before an attendant who selects pieces therefrom for packing.

It is not the custom to provide an attendant for each bin, since ordinarily one attendant can pack fast enough to take care of several bins. It not infrequently occurs, however, that as the grading progresses one or another grade may preponderate over the others from time to time, whereby certain bins receive fruit more rapidly than others for the time being. If the attendant happens to be packing from another bin at such a time, this situation may not be noticed until the bin overflows, whereupon a considerable quantity of fruit may fall upon the floor before the attendant can reduce the quantity of fruit in the bin or adjust the grading means to deliver the fruit to another bin. Consequently, considerable loss may result to the packer by reason of bruised fruit which cannot be marketed.

A similar result is also sometimes occasioned by reason of unequal delivery or removal of fruit from a bin whereby one side may fill more rapidly than another and cause binding of the supporting bearings or other parts so as to prevent depression of the bin bottom, whereupon the fruit overflows from the bin, which is unable to receive the load it was intended to carry.

Another disadvantage met with in the construction of known types of rotary bins is the difficulty in adjusting the depressible bottoms so as to suit the bins to use with different kinds of fruit. It will be understood that throughout a packing season a bin may be used to dispense various kinds of fruit, which may differ widely in densities. It is, therefore, necessary, in order to utilize the full capacity of the bin, that its bottom be adjusted to suit the kind of fruit with which the bin is to be used; that is to say, the bottom should be adjusted so that the volume of fruit which will fill the bin will also be sufficient in weight to depress the bin bottom to its full extent. Otherwise it may happen that as the fruit is delivered to the bin its weight is not sufficient to depress the bin bottom in proportion to its volume, so that the bin may overflow although the bin bottom is not fully depressed. On the other hand, if the bin bottom is adjusted for use with a light fruit and the bin is then used with a heavier fruit, it may happen that the bottom is depressed too much in proportion to the volume of fruit thereon so that the level of the mass of fruit is not maintained high enough. In this event the increased height from which the fruit falls from the delivery means to the top of the mass of fruit in the bin may result in injury to the fruit.

In bins of known construction either no adjusting means is provided for their bottoms, in which case the difficulties above recited are met with, or where adjusting means are provided they are so inaccessible and difficult of operation that they are unsatisfactory in use.

It is the general object of my invention to provide a rotary bin in which the above conditions are alleviated. For example, it is one of the features of the invention that means is provided for stopping rotation of the bin when it becomes full. By the provision of such a means I have found that such bins may be used with grading apparatus and whenever one of them becomes filled and rotation ceases the pieces of fruit thereafter delivered to the bin, instead of overflowing, build up a barrier at their point of delivery into the bin whereby the succeeding pieces of fruit are backed up into the grading or other delivery means so that they are delivered into the next bin. By this construction, therefore, it will be seen that when a bin is filled the remaining fruit, instead of piling up in the bin until it overflows, is automatically directed into the next succeeding bin.

Another advantage resulting from such construction is, that the stoppage of a bin serves to attract the attention of the attendants who can, thereupon, relieve the overcrowded condition immediately. Of course where more than one bin is provided for the reception of fruit of a given grade, there is no need for immediate attention when the first of the bins for that grade becomes full and stops, since the fruit is automatically shunted on to the reserve bin or bins. However, when all of the bins for the given grade become full, that fruit which is then shunted on to a succeeding bin past the full bins is mixed with fruit of another grade. This result, while not altogether desirable is better than damaging the fruit so that it is entirely lost. However, since the stoppage of the bin ordinarily serves to attract the attention of nearby attendants, they are usually enabled to relieve the overcrowded condition before mixing of the grades occurs.

I have also provided a rotary bin with certain other structural features which provide for ready adjustability of the bin bottom so that the bin may be adapted for use with articles of varying densities, and also the construction is such that binding of the parts due to unequal loading is entirely prevented.

It is among the objects of the invention to provide a rotary bin having means for automatically stopping rotation of the bin when it becomes full.

It is also an object to provide a rotary bin with means for automatically stopping its rotation when it becomes full but which causes rotation at such times as the bin is less than full.

Another object is to provide a rotary bin with means for disconnecting the same from its driving mechanism when the bin is full and automatically re-engaging the same when the bin is less than full.

A further object is to provide a circular bin having a depressible bottom and means for readily adjusting the depressibility thereof.

A still further object is to provide a circular dispensing bin having a depressible bottom and so constructed that binding or sticking of parts due to unequal loading is prevented.

With the above mentioned and other objects in view, the invention resides in the novel construction and combination of parts hereinafter described, illustrated in the accompanying drawing, and set forth in the claims hereto appended, it being understood that various changes and modifications may be resorted to without departing from the spirit or scope of the invention, and I deem myself entitled to all such changes and modifications as fall within the scope of the claims hereto appended.

Referring to the drawing, wherein like reference characters denote like parts throughout the several views.

Figure 2:
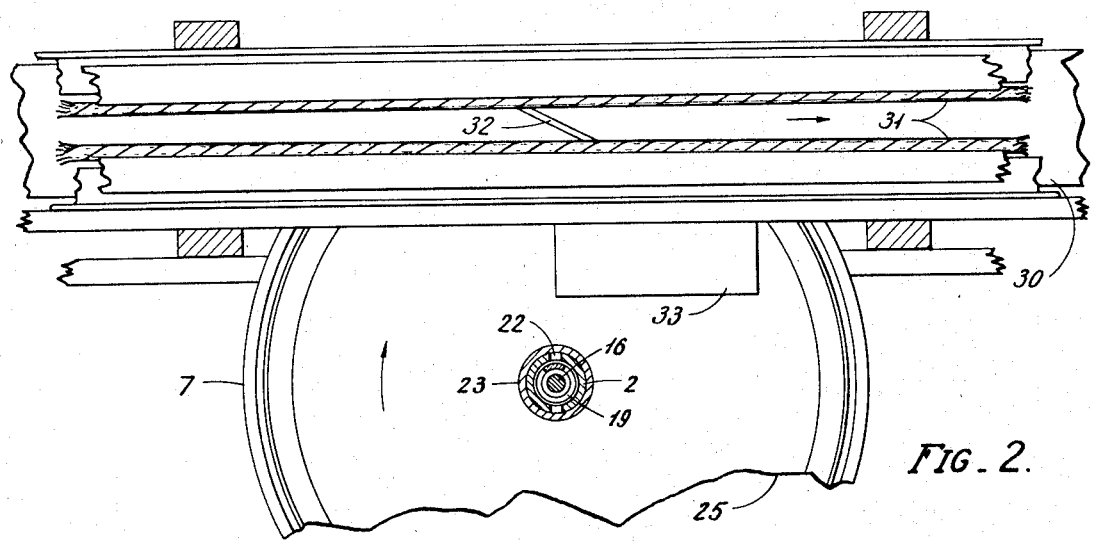
Figure 2 is a view of the apparatus shown in Figure 1, being partly in plan and partly in section as seen along the line 2—2 of Figure 1.
Figure 1:
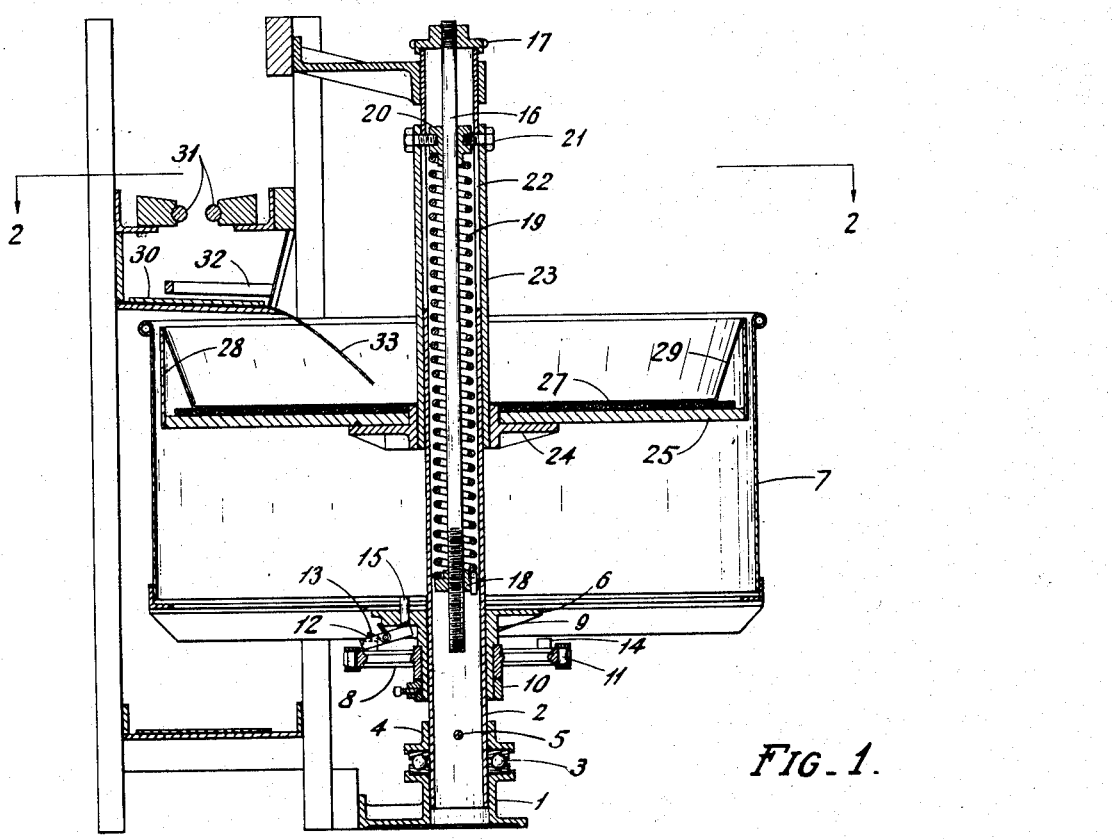
Figure 1 is a vertical cross section of an apparatus embodying my invention, the same being illustrated as associated with grading and distributing mechanism.

As illustrated in the drawing, the apparatus comprises a pedestal 1 which forms a socket for the lower end of an upwardly projecting hollow rotatable shaft 2, and also supports said shaft by means of the thrust bearing 3 and collar 4, the collar being pinned to the shaft at 5. Affixed to the shaft 5, so as to rotate therewith, is a seat 6, upon which rests a circular bin 7.

A driving means is provided for rotating the bin 7 and comprises a sprocket 8 loosely journaled on the hub 9 of the seat 6 and held in place by means of a collar 10. The sprocket may be driven continuously from any suitable source of power by means of a chain 11.

The driving connection between the sprocket 8 and the bin 7 comprises a pawl 12 pivotally secured to the underside of the seat 6 and normally depressed by a spring 13 so as to engage one of a series of upstanding lugs 14 provided on the upper side of the sprocket 8. A vertically disposed pin 15 passing through the seat 6 rests upon one end of the pawl 12, and it will be seen that if the pin 15 is depressed the pawl is lifted out of engagement with the lugs 14 whereby the bin is disconnected from the continuously driven sprocket 8. The manner of depressing the pin will presently be described.

Axially disposed within the shaft 2 is a rod 16 secured to and depending from a cap 17 fitted over the top of the shaft 2, and threaded at its lower end to carry a stop nut 18. Surrounding the rod 16 and above the stop nut 18 is a helical spring 19 which supports the collar 20. Threaded into said collar are bolts 21 which extend through slots 22 in the shaft 2 and support an outer sleeve 23 of considerable length and slidably mounted upon the shaft 2 for vertical movement thereover. Mounted upon the lower end of the outer sleeve 23 is a seat or flange 24 upon which rests a circular tray 25, which forms the bin bottom and which is preferably padded as at 27 to minimize the danger of bruising the fruit, and provided with a peripheral wall 28. This tray is of less diameter than the internal diameter of the bin 7, permitting vertical movement of the tray within the bin.

By the construction just described it will be seen that the bin bottom or tray 25 is supported by the spring 19 so that it may be depressed when a weight is placed thereon. The yieldability of the tray 25 may readily be regulated by means of the cap 17, which may be turned so as to cause the nut 18 to compress the spring 19 more or less and thus determine the amount the tray 25 will be depressed under a given weight. When the tray is depressed to its full extent its bottom engages the pin 15 so as to depress the same and disengage the pawl 12 from the sprocket 8. When this occurs the bin ceases to rotate.

The concentric sleeve and shaft which form the support and bearing for the bin bottom 25 serve to spread any inequalities in the distribution of weight on the bin bottom over a large bearing surface so that binding or tilting of the bottom is altogether prevented and the bottom is free to be depressed at all times.

The purpose of the tray wall 28 is to prevent pinching of pieces of fruit between the tray and the bin wall 7. It has been found that in the operation of trays without walls the upward movement of the tray, combined with the pressure of the fruit in the bin, causes those pieces of fruit next to the bin wall to be rolled along and pinched between the tray and the bin wall so as to crush them. On the other hand, operation has proven that when the tray is provided with a wall such as 28, the wall tends to keep the fruit away from the bin wall and pinching is prevented. Another advantage resulting from the provision of the wall 28 is that a considerable portion of the fruit is maintained out of contact with the bin wall, thus reducing friction and permitting easier movement of the bin bottom. A piece of flexible material 29, such as cloth or the like, is secured to the tray wall and bottom, as shown, so as to form a resilient surface for the fruit to bear against.

In the construction shown the fruit is fed to the bin by means of an endless conveyor 30 which operates in the direction indicated by the arrow, and which may be the carrier belt of a fruit sizer such as indicated by the divergent sizing ropes 31, or may be any ordinary conveyor. In practice it is contemplated that the belt 30 shall distribute fruit to a plurality of bins, but since all the bins are identical only one is illustrated in the drawing. It will be understood that others are provided. The pieces of fruit are carried along by the belt 30 until they strike the diverting strip 32, which shunts them off the belt into the bin over a flexible ramp 33, which brakes their fall into the bin.

In the operation of the device, as the fruit is delivered over the ramp 33 into the bin the weight of the fruit depresses the bin bottom 25 according to the amount of fruit in the bin. The pawl 12 being in engagement with the sprocket 8 the bin is slowly rotated so that the fruit is passed before an attendant who removes the fruit from the bin for packing.

Suppose, however, that the attendant is called to another bin and during his absence fruit continues to be delivered to the bin. It is assumed that the cap 17 has been adjusted to suit the fruit being delivered to the bin so that as the fruit accumulates the bottom 25 is depressed so as to prevent overflow. Eventually, however, the bin becomes full, at which time the bottom 25 engages and depresses the pin 15 so as to disengage the pawl 12 from the sprocket 8. The bin, thereupon, ceases to rotate and this cessation of rotation calls the attendant's attention to the fact that the bin is full.

The attendant, being apprised of the situation, may then begin removing fruit from the bin, whereupon the bottom 25 rises and the pawl 12 again engages the sprocket 8, and rotation is resumed.

If the attendant does not remove fruit from the bin after it is filled, the pieces of fruit pile up at the point of delivery and choke up the ramp 33 so that succeeding pieces of fruit are not delivered to the bin. These pieces simply jump over the diverting strip 32 and are carried along until they reach the diverting strip at the next bin where they are delivered to that bin. In this manner, overflow of fruit is prevented and, consequently, the fruit is saved from damage.

Having now described my invention and in what manner the same may be used, what I claim as new and desire to protect by Letters Patent is:

1. In a rotary dispensing bin having a depressible bottom, means for rotating the bin, and means actuated by the lowering of the bin bottom adapted to render said bin rotating means ineffective when the bin bottom is depressed a predetermined amount.

2. In a rotary dispensing bin having a depressible bottom, driving means connected with the bin for rotating the same, and means actuated by the bin bottom when depressed a predetermined amount for disconnecting the driving means.

3. In a rotary dispensing bin having a depressible bottom, driving means for rotating the bin, means secured to the bin and normally engaging with the driving means whereby the bin is rotated, and a plunger adapted to disengage said last named means from the driving means, said plunger being arranged for actuation by the bin bottom when said bin bottom is depressed a predetermined amount.

4. In a dispensing apparatus, an upright hollow shaft, a sleeve surrounding said shaft and slidable thereover, a tray secured to the sleeve for movement therewith, yieldable supporting means disposed within said shaft means for supporting said sleeve and associated tray by said yieldable supporting means, and driving means for imparting rotation to the tray.

5. In a dispensing apparatus, an upright hollow shaft, a sleeve surrounding said shaft and slidable thereover, a tray secured to the sleeve for movement therewith, yieldable supporting means disposed within said shaft means for supporting said sleeve and associated tray by said yieldable supporting means, means for adjusting the yieldability of said yieldable means, and driving means for imparting rotation to the tray.

6. A rotary dispensing bin comprising an annular wall, an upright rotatable shaft for supporting and rotating said wall, a sleeve surrounding said shaft and slidable thereover, a circular tray disposed within said wall and secured to the sleeve, means interlocking said sleeve and shaft whereby they rotate together, and yieldable means disposed within said shaft and adapted to support said sleeve and associated tray.

7. In a dispensing apparatus, an upright hollow shaft, means for driving the shaft, a sleeve surrounding said shaft and slidable thereover a tray secured to the sleeve for movement therewith, a rod extending within said shaft, a spring supported by said rod, and means projecting through a slot in said hollow shaft and associated with the sleeve and the spring whereby the sleeve and its associated tray are supported by the spring.

8. In a dispensing apparatus, an upright hollow shaft, means for driving the shaft a sleeve surrounding said shaft and slidable thereover a tray secured to the sleeve for movement therewith, a rod extending within said shaft, means associated with said rod for supporting said spring and adjusting its yieldability, and means projecting through a slot in said hollow shaft and associated with the sleeve and the spring whereby the sleeve and its associated tray are supported by the spring.

9. In a dispensing apparatus, an upright hollow shaft adapted for rotation, a slidable sleeve surrounding said shaft and carrying a tray, a rod extending within said shaft, means associated with the shaft for supporting said rod, a spring, a support for said spring threaded on the rod whereby the yieldability of the spring may be varied by rotation of the rod relative to the shaft, means secured to the said sleeve and extending through a slot in said shaft into engagement with the spring whereby the sleeve and shaft rotate together, and the sleeve and its associated tray are supported by the spring.

10. In a fruit dispensing apparatus, a rotary bin, means for rotating said bin, means for delivering fruit to the bin, and means actuated by the delivery of a predetermined weight of fruit into the bin to stop its rotation.

11. In a fruit dispensing apparatus, a rotary bin, means for rotating said bin, means for delivering fruit to the bin means actuated by the delivery of a predetermined weight of fruit into the bin to stop its rotation, and means for varying the weight of fruit required to stop the bin.

12. In a fruit dispensing apparatus, a rotary bin having a depressible bottom, driving means for rotating the bin traveling means extending past the bin for delivering fruit thereto, and means actuated by a predetermined lowering of the bin bottom for stopping rotation of the bin to cause fruit subsequently delivered thereto to pile up at its point of delivery to the bin and form a barrier causing further fruit presented to the bin to be carried therepast to a succeeding point of delivery.

13. In a fruit dispensing apparatus, a conveyer for conveying the fruit, means intermediate the length of the conveyor for discharging the pieces of fruit therefrom, a rotary bin having a depressible bottom for receiving the fruit discharged from the conveyor, driving means for rotating the bin, and means actuated by a predetermined lowering of the bin bottom for stopping rotation of the bin to cause fruit subsequently delivered thereto to pile up at its point of discharge into the bin and form a barrier causing further fruit presented to the bin to be conveyed therepast to a succeeding point of discharge.

14. In a fruit dispensing apparatus, a conveyer for conveying the fruit, a diverting member disposed above the conveyer intermediate its length for discharging fruit therefrom, a rotary bin having a depressible bottom disposed to receive fruit discharged by said diverting member, driving means for rotating the bin, and means actuated by a predetermined lowering of the bin bottom for stopping rotation of the bin to cause fruit subsequently delivered thereto to pile up at its point of discharge into the bin and form a barrier causing further fruit presented to the bin to be conveyed therepast over the diverting member to a succeeding point of discharge.

WILLIAM DE BACK.